United States Patent
Bussinger

(10) Patent No.: US 6,523,661 B1
(45) Date of Patent: Feb. 25, 2003

(54) VEHICLE WHEEL DRIVE DISCONNECT SYSTEM PERMITTING FREE WHEELING OF THE WHEEL ON A VEHICLE DRIVE AXLE

(75) Inventor: Allen L. Bussinger, Bridgeport, MI (US)

(73) Assignee: Amigo Mobility International, Inc., Bridgeport, MI (US)

( * ) Notice: Subject to any disclaimer, the term of this patent is extended or adjusted under 35 U.S.C. 154(b) by 0 days.

(21) Appl. No.: 09/591,838

(22) Filed: Jun. 9, 2000

Related U.S. Application Data

(60) Provisional application No. 60/142,493, filed on Jul. 6, 1999.

(51) Int. Cl.[7] .................................................. F16D 11/00
(52) U.S. Cl. .................. 192/69.4; 180/65.1; 180/69.63; 180/89.27
(58) Field of Search ................................ 180/65.1, 907; 192/69.4, 69.43, 69.63, 89.27; 301/1, 64.4; 403/1

(56) References Cited

U.S. PATENT DOCUMENTS

| | | | | |
|---|---|---|---|---|
| 3,184,258 A | * | 5/1965 | Kapusta | 403/1 |
| 3,198,923 A | * | 8/1965 | Tripp | 200/308 |
| 3,251,630 A | * | 5/1966 | Astley | 301/1 |
| 3,889,773 A | * | 6/1975 | Chant | 180/65.2 |
| 4,504,094 A | * | 3/1985 | Burrows | 301/6.1 |
| 4,512,613 A | * | 4/1985 | Nassiri | 301/1 |
| 5,161,630 A | * | 11/1992 | Garin, III et al. | 180/65.2 |
| 5,394,968 A | * | 3/1995 | Yu-Shu | 192/69.4 |

\* cited by examiner

Primary Examiner—Robert P. Olszewski
Assistant Examiner—James S. McClellan
(74) Attorney, Agent, or Firm—Reising, Ethington, Barnes, Kisselle, Learman & McCulloch, P.C.

(57) ABSTRACT

A wheel drive disconnect system for use in electrically powered vehicles for transporting the physically challenged having at least one wheel comprising a rim, a wheel hub sleeve, and a radially extending plate connecting the rim and hub sleeve. A rotatably driven shaft drive is freely received by the hub sleeve and a releasable drive transmitter axially freely receives the drive shaft device and has a first position in which it is driven and a second axially displaced position in which it is not. Protrusions and drive surfaces provided between the wheel plate and drive transmitter are in radial alignment for driving the wheel in rotation when the drive transmitter member is in the first position and for permitting free wheeling of the wheel when the drive transmitter has been axially displaced and the protrusions and drive surfaces are out of radial alignment.

6 Claims, 5 Drawing Sheets

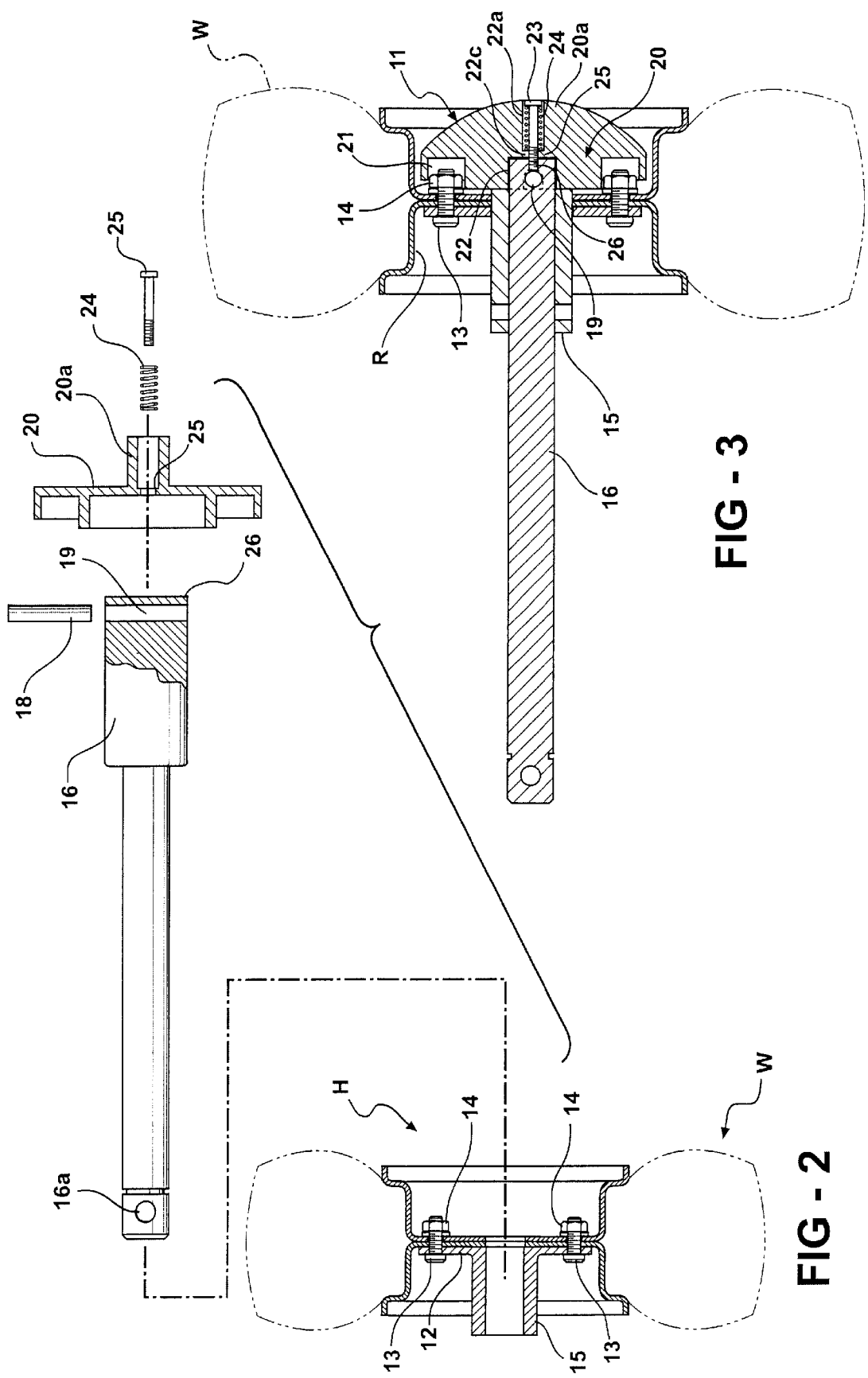

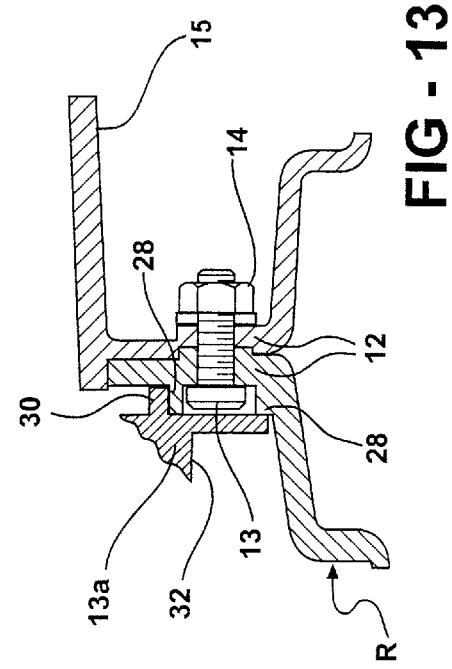
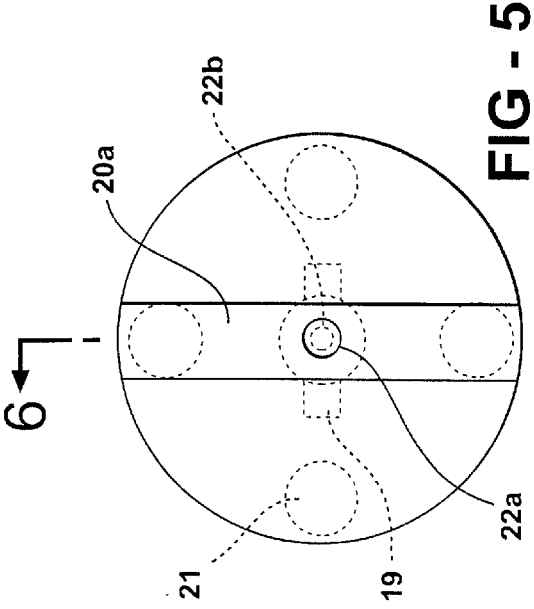
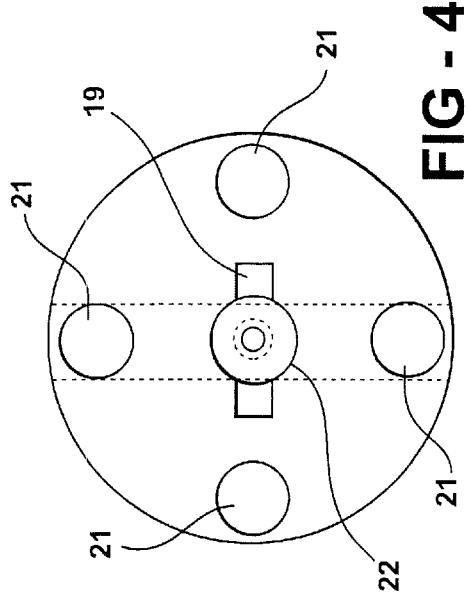
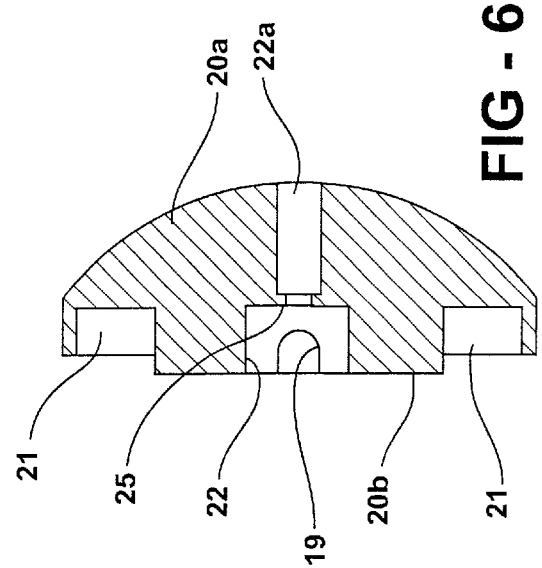

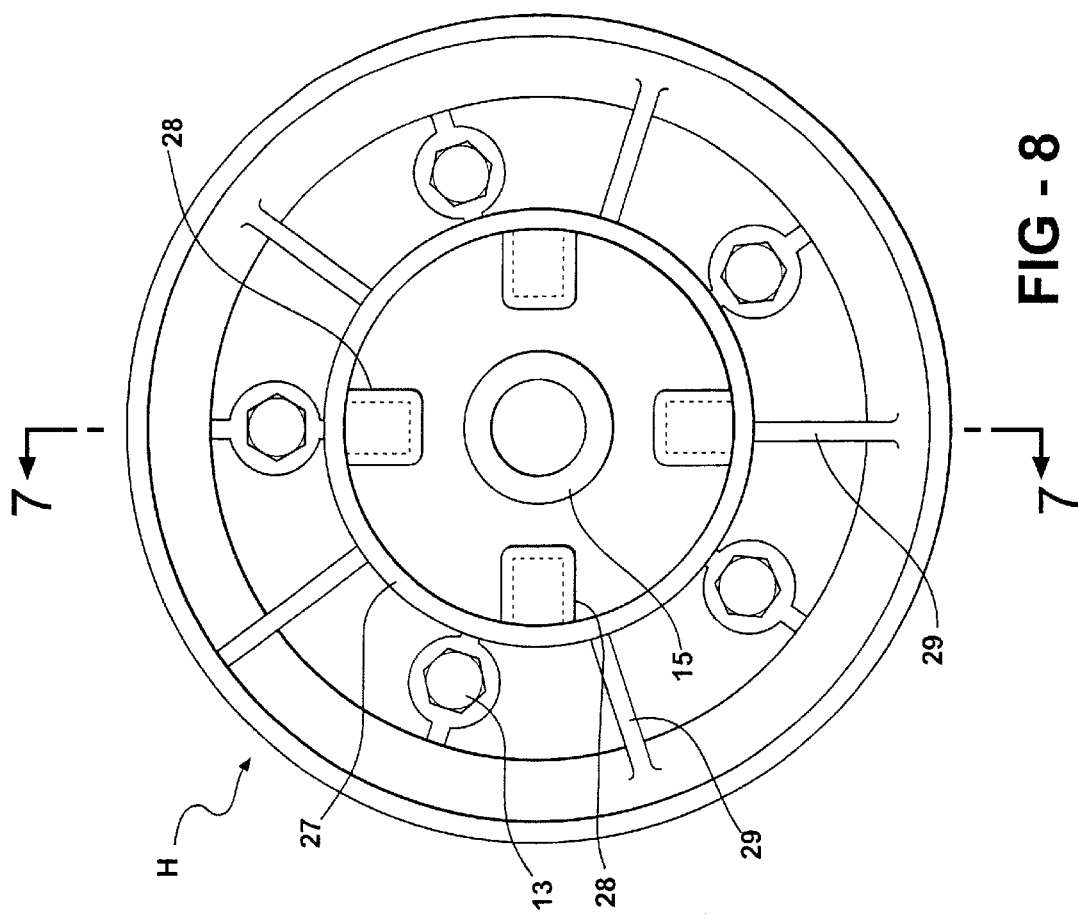
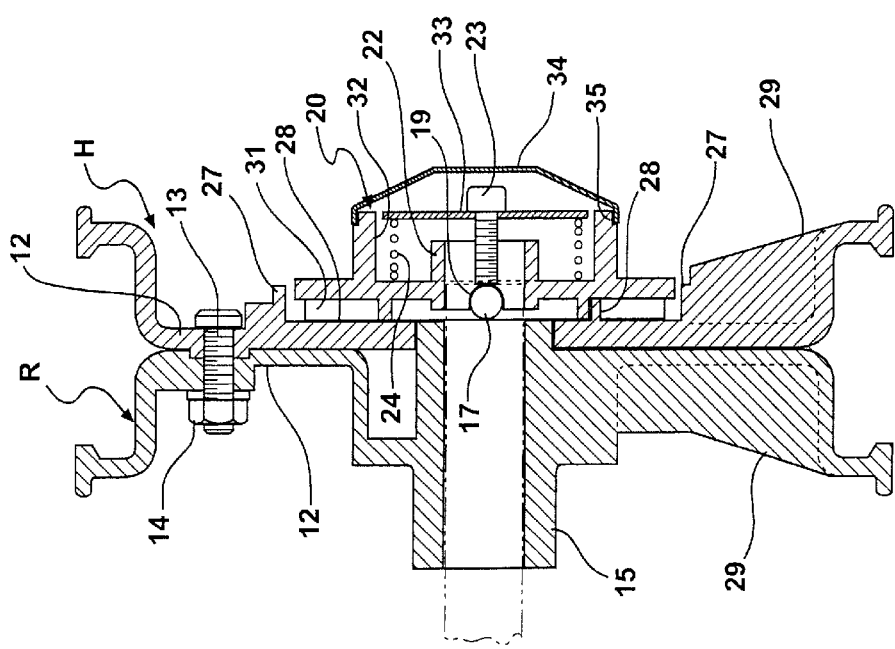

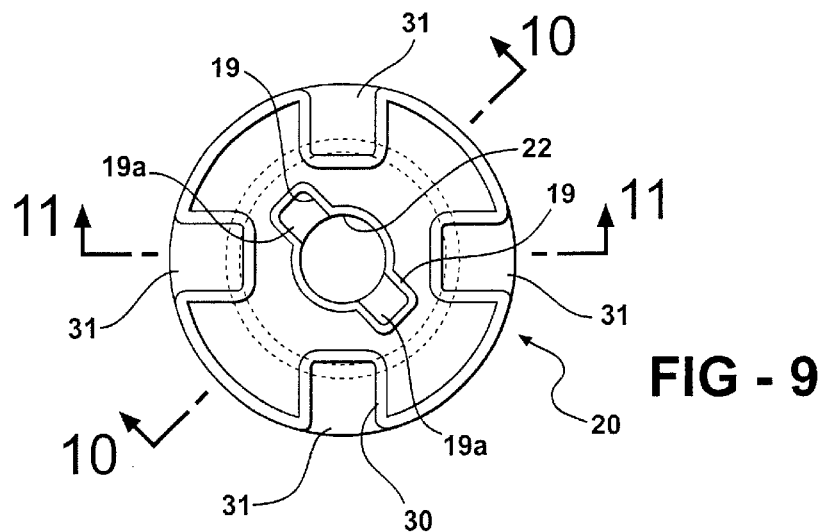
FIG - 9
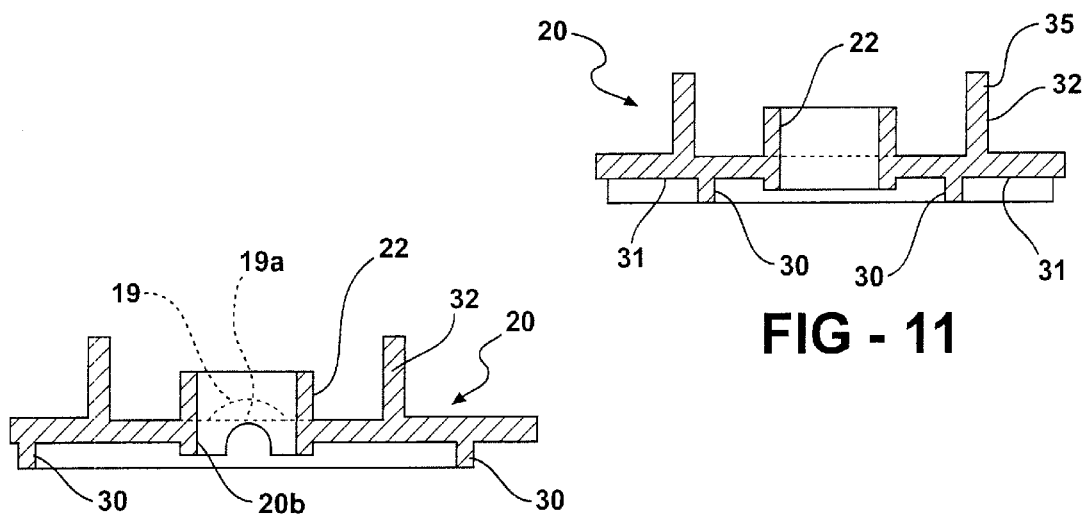
FIG - 11
FIG - 10
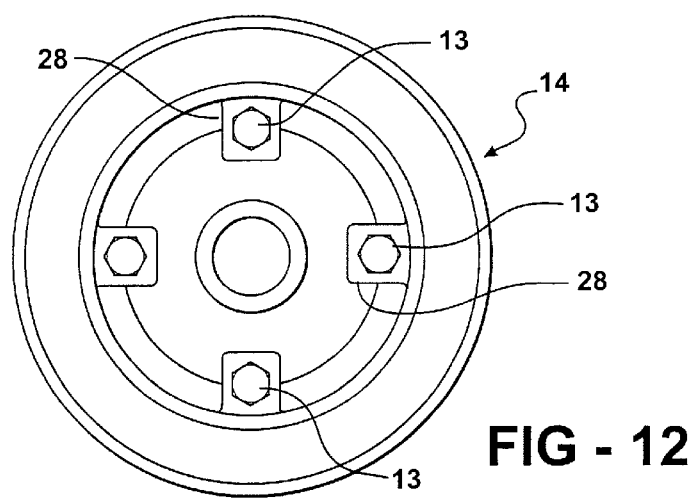
FIG - 12

US 6,523,661 B1

VEHICLE WHEEL DRIVE DISCONNECT SYSTEM PERMITTING FREE WHEELING OF THE WHEEL ON A VEHICLE DRIVE AXLE

This invention, which claims the priority of provisional application 60/142,493 filed Jul. 6, 1999, relates particularly to vehicle mount assemblies for the drive axles of electrically driven carts of the type used by the physically challenged and to methods of constructing and operating them.

BACKGROUND OF THE INVENTION

While various wheel release mechanisms have been proposed in the past for vehicles of this character, as shown, for instance, in U.S. Pat. Nos. 3,889,773, 4,504,094 and 5,394,968, all of which I incorporate herein by reference, they have been of a relatively complex and expensive nature or have not been friction free.

SUMMARY OF THE INVENTION

The present invention is concerned with a system which is simple, economic, and has a minimum number of parts. In the several embodiments illustrated, it is used in conjunction with a vehicle wheel which has a rim connected with a hub by a radial plate having circumferentially spaced protrusions on the plate which may comprise the nut and bolt assemblies used to secure the plate sections which form the plate. An axially displaceable drive transmitting member which receives the drive shaft or axle also disengageably receives the protrusions. The system preferably incorporates a simple cross pin carried by the driven axle or an axle extension which is normally received in a pin accommodation housing on the inner face of the drive transmitting member and a yieldable device reactable between the axle or axle extension which normally maintains the nested relationship of the pin in the housing, but is yieldable to permit the drive transmitter or actuator member to withdraw and rotate to a position in which it is held out of driving engagement with the pin and axle and the protrusions are free of the drive transmitting member to permit the wheel to free wheel.

THE DRAWINGS

The presently preferred embodiment of the invention is disclosed in the following description and in the accompanying drawings, wherein:

FIG. 2 is a reduced scale, partly sectional view of the right end of such a wheel and axle assembly, illustrating an exploded view configuration of the parts;

FIG. 3 is an enlarged fragmentary, sectional view of the assembly of FIG. 2 with the parts in assembled position;

FIG. 4 is an internal facial view of the releasable actuator or drive transmitter member only;

FIG. 5 is an opposite facial view of the same member;

FIG. 6 is a sectional view taken on the line 6—6 of FIG. 5.

FIG. 7 is a transverse sectional view illustrating another embodiment;

FIG. 8 is an outer face view of the wheel face only;

FIG. 9 is an inner face elevational view of the actuator member only;

FIG. 10 is a cross sectional view taken on the line 10—10 of FIG. 9;

FIG. 11 is a cross sectional view taken on the line 11—11 of FIG. 9;

FIG. 12 is an outer face view, similar to FIG. 8, of another wheel face; and

FIG. 13 is a fragmentary, transverse sectional view illustrating another form of the invention which is used with this wheel.

DETAILED DESCRIPTION

Figure 1:
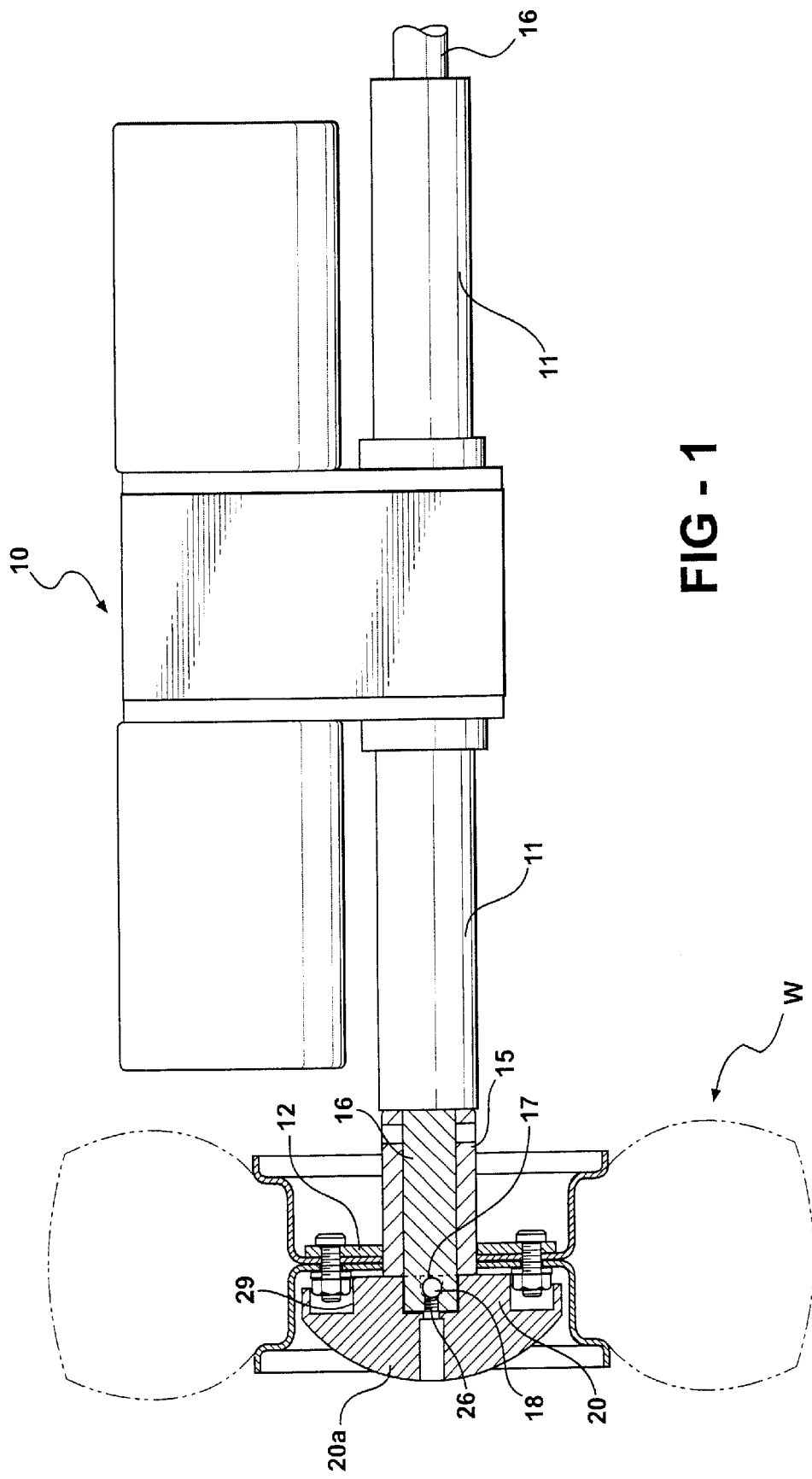
FIG. 1 is a partly sectional, partial rear elevational view showing the left end portion of a wheel and axle assembly for vehicles of the character mentioned.

FIG. 1 shows a dual electric motor drive assembly 10 for axle or drive shaft assemblies, generally designated 11, which are to releasably drive wheels W. The wheels W have rims R joined to wheel hubs, generally designated H, by backer plates 12 (FIG. 2) which may comprise plate sections secured together by bolts 13 and nuts 14. The hubs H comprise axle receiving sleeves 15 projecting from plates 12 axially inwardly.

Reduced diameter stub axles or drive shafts 16 which are freely received by hubs H are connected at their inner ends to the electric motor drive elements at 16a. At their outer ends, each stub axle 16 has a bore 17 receiving a cross pin 18 which is normally received in a bifurcated slot or housing 19 provided in the inner face of an axially movable release drive transmitting member or actuator 20 having a curvilinear handle rib 20a. The slot 19 is bifurcated by a bore 22 which slideably receives the outer end of stub axle 16. Member 20 also has four internally facing annular recesses 21 in which the annular nuts 14 can be received. The marginal walls of recesses 21 may be referenced as drive surfaces and the nuts 14 as protrusions. Rib 20a has a central bore, generally designated 22a, including an outer portion for receiving screw 23 (FIG. 3), and a yieldable member comprising an actuator return spring 24. The bore 22a includes also a reduced diameter portion 22c which defines a spring restraining shoulder 25, and a portion 22c communicating with bore 22a. Each stub axle 16 has an inner threaded bore 26 (FIG. 3) to threadedly receive and retain the spring retaining screw 23.

THE OPERATION

In operation, with pin 18 in slot 19, a given wheel W is normally driven in rotation with the nuts 14 on plate 12 received in openings 21. When handle rib 20a is pulled outwardly and compresses spring 24, slot 19 is pulled away from pin 18 as drive transmitting member 20 moves outwardly, and recesses 21 move axially away from nuts or protrusions 14 to a position radially free of them and the ends of bolts 13. Rib 20a and member 20 can then be rotated 90° to a neutral position in which slot 19 is crosswise to pin 18 and the wheel W is removed from the drive of stub axle 16 and free wheels. In this position of drive transmitting member or actuator 20, the internal face portion 20b of the member 20 bearing on pin 18 holds the member 20 in its outward or withdrawn position. The drive is restored by rotating member 20 through ninety degrees and permitting spring 24 to move member 20 inwardly again to restore slot 19 to a position capturing pin 18, and bores 21 to a position axially receiving and driving nuts 14.

FIGS. 7–11 illustrate a further embodiment of the invention in which the same numerals have been used, where appropriate, to identify similar parts. In this embodiment of the invention, the wheel W, which includes the tire rim part R, includes plates 12 with plate sections secured together as previously by nuts and bolts 13 and 14 respectively. The plate 12 is provided with an outwardly projecting circular rib 27 within which the actuator or drive transmitting member, generally designated 20, is received, as shown in FIG. 7. Finally, within the flange or rib 27, axially outwardly projecting, preferably rectangular, hollow protrusions 28 are provided at 90° intervals, as shown in FIG. 8, particularly. Wheel W also is provided with strengthening ribs 29 on each of the plate sections forming plates 12.

As FIG. 9 particularly makes clear, the drive transmitting actuator 20 has a scalloped bottom rib wall 30 with inset protrusion receiving recesses 31, for normally axially receiving the axial protrusions 28 on the wheel plate 12. The construction disclosed replaces the recesses 21, provided in the first embodiment for receiving the nuts 14, to provide a more precise fit of the parts for the purpose of transmitting the drive. The marginal walls 30 of recesses 31 may be referenced as drive surfaces which drive protrusions 28.

The bore 22, which bifurcates pin receiving slot 19, no longer leads to a spring accommodating recess, and, rather, a diametrally enlarged spring 24 is accommodated within an annular knob forming wall 32 and bears against a washer 33 retained by the screw 23 which, as previously, threads into the end of stub axle 16. A resiliently retained cover 34 is provided for the knob 32 and releasably seats in an annular notch 35 provided in the knob wall 32 by snapping into it.

The operation is the same as previously, in that, when the pin 18 is within slot 19, a given wheel is normally driven in rotation with the drive providing protrusions 28 received within the protrusion capturing recesses or cavities 31 in actuator 20. When the knob 32 is pulled outwardly and compresses spring 24, housing 19 with its slot parts 19a is pulled away from pin 18 as member 20 moves outwardly, and recesses 31 move axially outwardly away from the protrusions 28 on the wheel hub H to a position radially free of them. The knob 32 can then be rotated 90° to a neutral position in which slot housing 19 is crosswise to pin 18 and the wheel W is removed from the drive of stub axle 16, and free wheels.

In this removed position of the actuator 20, the member 20 is held in outward or withdrawn position by wall 20b bearing on pin 18. When member 20 is rotated through 90° and spring 24 is permitted to move actuator member 20 axially inwardly once again to restore slot 19 to a position receiving pin 18, and cavities 31 to a position receiving the protrusions 28, the drive is restored.

Still another embodiment of the invention is illustrated in FIGS. 12 and 13 in which the protrusions or nubs 28 are formed on the plate 12 at the radial location of the bolts 13 and openings 13a are provided for the bolts 13. Except for the location of the protrusions 28, the construction and operation of the components is the same as described with reference to FIGS. 7–11 and the same numerals have appropriately been used to identify them. Here, again the marginal walls 30 of recesses 31 may be referenced as drive surfaces which drive protrusions 28.

In any of the embodiments, when a two wheel drive is driving the rear vehicle wheels, both release members 20 must be disengaged to effect free wheeling. When a transaxle which has an integrated differential is employed, the members 20 can be released selectively.

The disclosed embodiment is representative of a presently preferred form of the invention, but is intended to be illustrative rather than definitive thereof. The invention is defined in the claims.

I claim:

1. A wheel drive disconnect system for use in electrically powered vehicles for transporting the physically challenged, wherein the system comprises:

a. at least one wheel comprising a rim, a wheel hub sleeve, and a radially extending plate connecting the rim and hub sleeve;

b. an electrically powered motor mechanism including a powered rotatably driven shaft device freely received by said hub sleeve for relative rotation therewith;

c. an axially displaceable releasable drive transmitting member axially freely receiving said drive shaft device and having a first position in which it receives the drive rotation of said drive shaft device and a second axially displaced position in which it does not;

d. protrusions and drive surfaces provided between said wheel plate and said drive transmitting member radially disposed outwardly of said wheel hub sleeve in radial alignment for driving said wheel in rotation when said drive transmitting member is in said first position and for permitting free wheeling of said wheel when said drive transmitting member has been axially displaced and said protrusions and drive surfaces are out of radial alignment;

e. said protrusions being on said wheel plate and said drive surfaces being provided as recess walls in said drive transmitting member within which said protrusions are received for transmitting a drive in both directions of rotation when said drive transmitting member is in said first position;

f. said protrusions being circumferentially spaced nubs provided on said wheel plate; and g. said wheel plate comprising a pair of rim plate sections and bolt and nut assemblies for clamping said sections extending through said nubs.

2. A wheel drive disconnect system for use in electrically powered vehicles for transporting the physically challenged, wherein the system comprises:

a. at least one wheel comprising a rim, a wheel hub sleeve, and a radially extending plate connecting the rim and hub sleeve;

b. an electrically powered motor mechanism including a powered rotatably driven shaft device freely received by said hub sleeve for relative rotation therewith;

c. an axially displaceable releasable drive transmitting member axially freely receiving said drive shaft device and having a first position in which it receives the drive rotation of said drive shaft device and a second axially displaced position in which it does not;

d. protrusions and drive surfaces provided between said wheel plate and drive transmitting member radially disposed outwardly of said wheel hub sleeve in radial alignment for driving said wheel in rotation when said drive transmitting member is in said first position and for permitting free wheeling of said wheel when said drive transmitting member has been axially displaced and said protrusions and drive surfaces are out of radial alignment; and e. said drive shaft device and drive transmitting member having a crosspin and crosspin slot connection and in said first position said crosspin being received in said slot, said drive transmitting member being mounted for limited axial movement relative to said drive shaft device and for rotary adjustment relative to said drive shaft device to an adjusted relative rotary location wherein said crosspin is removed from said slot and said drive transmitting member is held in said second position.

3. The system of claim 2 wherein said crosspin is mounted by said drive shaft device to project radially from said drive shaft device and said drive transmitting member has an axially inner surface in which said slot is provided, said crosspin being engaged with said axially inner surface when said drive transmitting member is rotated to said location, and a spring mechanism reactive to urge said drive transmitting member and drive shaft device axially together to releasably maintain said drive transmitting member in both said first and second positions.

4. A wheel drive disconnect system for use in electrically powered vehicles for transporting the physically challenged wherein at least one wheel comprises a rim, a wheel hub, and a radially extending plate connecting the rim and hub; and an electrically powered motor mechanism including a powered rotatably driven shaft device is freely received by said hub for relative rotation therewith; the improvement wherein;
   a. an axially displaceable drive transmitter freely mounts to said drive shaft device and has a first position in which it receives the drive rotation of said drive shaft device and a second axially displaced position in which it does not;
   b. protrusions and drive surfaces are provided on said wheel plate and drive transmitter radially disposed outwardly of said wheel hub in radial alignment for driving said wheel in rotation when said drive transmitter is in said first position and for permitting free wheeling of said wheel when said drive transmitter has been axially displaced and said protrusions and drive surfaces are out of radial alignment;
   c. said protrusions being circumferentially spaced nubs provided on said wheel plate; and
   d. said wheel plate comprising a pair of rim plate sections and bolt and nut assemblies for clamping said sections extend through said nubs.

5. A wheel drive disconnect system for use in electrically powered vehicles for transporting the physically challenged wherein at least one wheel comprises a rim, a wheel hub, and a radially extending plate connecting the rim and hub; and an electrically powered motor mechanism including a powered rotatably driven shaft device is freely received by said hub for relative rotation therewith; the improvement wherein;
   a. an axially displaceable drive transmitter freely mounts to said drive shaft device and has a first position in which it receives the drive rotation of said drive shaft device and a second axially displaced position in which it does not; and
   b. protrusions and drive surfaces are provided on said wheel plate and drive transmitter radially disposed outwardly of said wheel hub in radial alignment for driving said wheel in rotation when said drive transmitter is in said first position and for permitting free wheeling of said wheel when said drive transmitter has been axially displaced and said protrusions and drive surfaces are out of radial alignment;
   c. said drive shaft device and drive transmitting member having a crosspin and crosspin slot connection and in said first position said crosspin being received in said slot, said drive transmitting member being mounted for limited axial movement relative to said drive shaft device and for rotary adjustment relative to said drive shaft device to an adjusted relative rotary location wherein said crosspin is removed from said slot and said drive transmitting member is held in said second position.

6. The system of claim 5 wherein said crosspin is mounted by said drive shaft device to project radially from said drive shaft device and said drive transmitting member has an axially inner surface in which said slot is provided, said crosspin being engaged with said axially inner surface when said drive transmitting member is rotated to said location, and a spring mechanism reactive to urge said drive transmitting member and drive shaft device axially together to releasably maintain said drive transmitting member in both said first and second positions.

* * * * *